(No Model.)
D. F. WINTERS.
STEP FOR VEHICLES.
No. 342,817. Patented June 1, 1886.
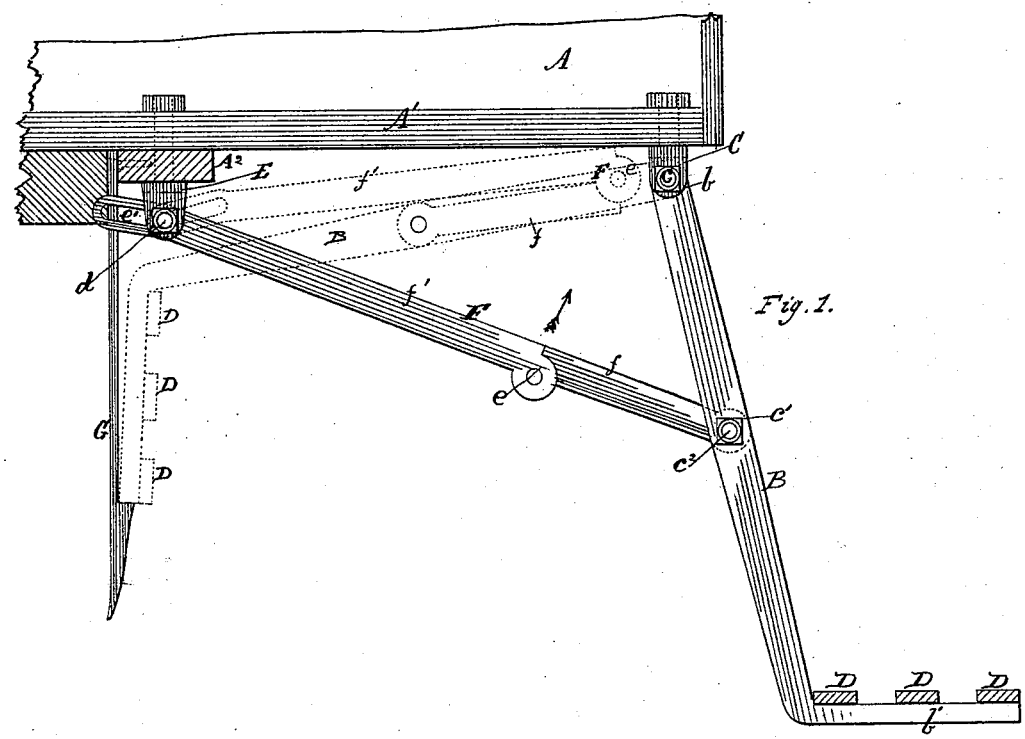
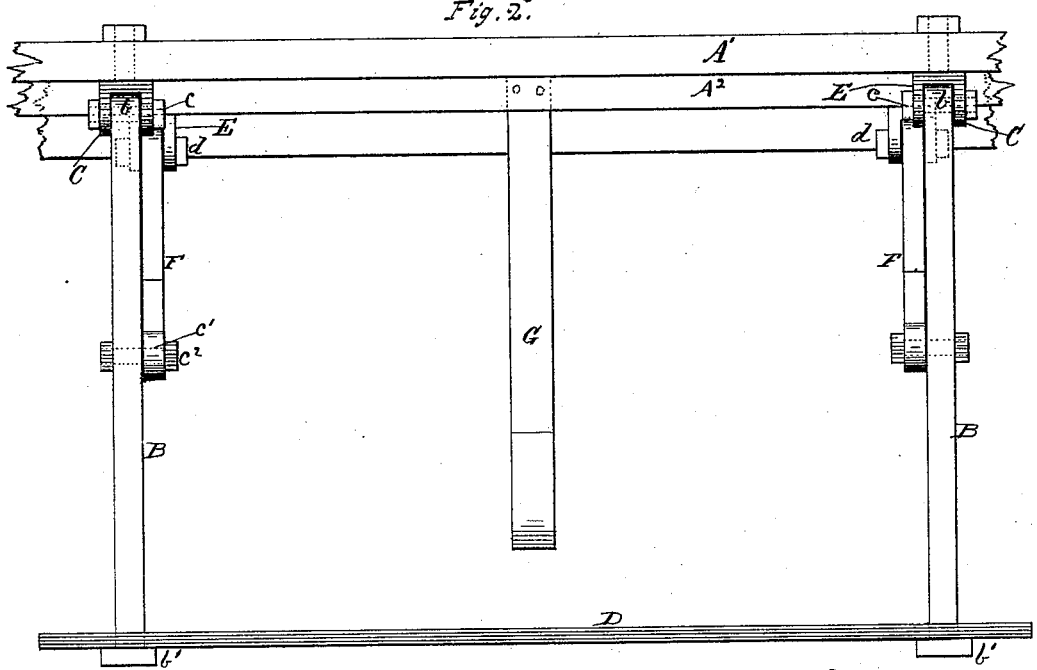
Witnesses:
Henry Schlingloff
Charles Seekerf
David F. Winters
Inventor
His Atty
Alex. Selkirk
N. PETERS. Photo-Lithographer. Washington, D. C.

United States Patent Office.

DAVID F. WINTERS, OF NASSAU, NEW YORK.

STEP FOR VEHICLES.

SPECIFICATION forming part of Letters Patent No. 342,817, dated June 1, 1886.

Application filed September 28, 1885. Serial No. 178,483. (No model.)

*To all whom it may concern:*

Be it known that I, DAVID F. WINTERS, a citizen of the United States, residing at Nassau, in the county of Rensselaer, State of New York, have invented certain new and useful Improvements in Steps for Vehicles, of which the following is a specification.

My invention relates to a folding step for vehicles, in which the arms of the step are hinged or jointed to the body of the vehicle or to a piece secured to the lower side of the same and braced by knuckle-jointed braces, which are pivoted at their forward ends to the arms of the step, and connected by means of slotted eyes to shackles secured to the lower side of the body of the vehicle, so as to be readily folded back underneath the body when it is secured by a keeper, which is also provided.

The objects of my invention are, primarily, to provide a step which will be so jointed to the body as to be adapted to be turned up underneath the same and out from a supporting position to a folded one when it is not to be used, and be readily turned down to a supporting position and held rigid and braced by a knuckle-jointed brace; and, secondly, to provide a folding step with specific means by which the step can be readily brought to position for use and be folded up beneath the body of the vehicle at will, so as to be in a situation free from liability to accidental injury, all of which will be hereinafter fully described, and specifically set forth in the claims. I attain these objects by means illustrated in the accompanying drawings, forming a part of this specification, in which—

Figure 1 is a side elevation illustrating my improved step and the manner in which its parts operate. Fig. 2 is a front view of the same applied to the rear end of the body of the vehicle.

The same letters of reference refer to like parts throughout both views.

A is the body of the vehicle, and A′ is the sill-piece of the frame of the body.

B B are step-arms, made each with eye $b$ at its upper end and with foot $b'$ at its lower end.

C C are ears secured to sill A′, and with these ears step-arms B B are pivoted by bolts $c$.

D D are slats or bars, which are supported on feet $b'$ of arms B, and are secured to the same by bolts or rivets, and form the floor of the step.

E E are shackles secured to any proper bar fixed to sills A′. The ears of these shackles are pierced, and receive bolts $d$ $d$.

F F are braces, provided each with knuckle-joint $e$. These jointed braces are pivoted at their forward ends to step-arms B, as at $c'$, by bolts $c^2$. The rear ends of these braces are each provided with a slot-form eye $e'$, which work, respectively, between the ears of shackles E, and receive bolt $d$.

G is an elastic catch, secured to bar $A^2$, or any other piece fixed to body A.

When the several parts above described are in position shown by full lines in Fig. 2, the step is in position for use, and a passenger can with safety step on the floor D, for passage into or from the carriage.

When the step is not to be used, the operator will break the set of joint $e$ of the jointed braces F by raising the portions $f$ upward to a short distance, as indicated by arrow, and at the same time push the foot ends of arms B back, when said arms will swing on their pivots $c$ underneath the body of the vehicle, as indicated by dotted lines in Fig. 1. As these arms are being swung back to position shown by dotted lines the limbs $f f'$ of braces F will gradually be made to fold together from their joint to position shown by dotted lines in the same figure, (the slot-form eye $e'$ in the while permitting limb $f'$ to draw forward between the ears of shackles E.) When the step has been fully folded back beneath the body of the vehicle, catch G will engage with a bar D of the step, and hold the step in its folded position in a situation in which it will not be liable to receive injury, and when in this folded position catch G, operating in one direction, and the rear end of slotted eyes $e'$, holding with bolts $e^2$, operating in another direction, will together hold the parts from moving or rattling.

When this step is to be used, the operator will free the step from catch G and swing its arms downwardly and forwardly, and by pulling down on the limbs of the jointed braces throw them into "set" at their knuckle-joints, when the arms will be securely braced against yielding back when the floor D is stepped upon.

It will be readily seen that the above-described step is readily applicable to omnibuses, carry-alls, stages, and other vehicles into which entrance is had from the rear of the vehicle, and that when not in use it may be folded beneath the body of the carriage, where it will not be liable to be struck and injured by passing vehicles, or when backing, as is the case where the step is secured in a rigid manner in one situation at the rear of the vehicle.

It should be understood that this improved step can be applied with advantage to the bodies of vehicles from their sides as well as their ends, and it is evident that the pivoted arms B of the step may be set nearer together than is shown, if preferred, and that the slats D may be omitted and a solid piece may be substituted. In some cases a single pivoted arm, B, with a step-pad made solid with it or attached thereto may be employed with a single jointed brace, in which the forward end portion, $f$, will be made bifurcated, and provided with ears, between which the arm will be pivoted by bolt $c^2$. When employing a single arm, B, I substitute for eye $b$ at its upper end a cross-head (having a total length of, say, about four inches) having its ends provided with pintle ends for jointing the same with eyebolts secured with the sill-pieces of the body of the vehicle.

If preferred, spiral springs may be substituted for catch G. In such a case I would connect one end of the springs to brackets secured to the lower side of the body of the vehicle, and their opposite ends to the step-arms B. In such a case these spiral springs will operate to draw the step-arms back as soon as the set of their jointed braces are broken, and will hold the same folded beneath the body, while when the step arms are turned to a vertical position these spiral springs will yield and permit said arms to be brought to position for presenting the floor of the step properly for passage into the vehicle.

Having described my invention, what I claim, and desire to secure by Letters Patent, is—

1. In a step for vehicles, a step-arm which is pivoted to the lower side of the body of a vehicle so as to be adapted to be swung back to beneath the said body, in combination with a knuckle-jointed brace, which has one end pivoted to the said arm and its opposite end provided with a slot-form eye held by a bolt with the body, substantially as and for the purpose set forth.

2. In a step, the combination, with arm B, hinged to the body of the vehicle, and a knuckle-jointed brace which is pivoted at its forward end with the step-arm and has its rear end provided with a slot-form eye and attached by a bolt to said body, of catch G, substantially as and for the purposes set forth.

3. In a step for a vehicle, the combination, with arms B B, provided with a stepping floor or platform, and hinged to the body of the vehicle, of the knuckle-jointed braces F pivoted at their forward ends to the respective arms B B, and having their rear ends provided with slotted eyes $e'$, shackles E, bolts $e^2$, and elastic catch G, substantially as and for the purposes set forth.

DAVID F. WINTERS.

Witnesses:
ALEX. SELKIRK, Jr.,
ALEX. SELKIRK.